US010141761B2

(12) United States Patent
Hoter-Ishay

(10) Patent No.: US 10,141,761 B2
(45) Date of Patent: Nov. 27, 2018

(54) RESCUE BATTERY

(76) Inventor: Idit Hoter-Ishay, New Haven, CT (US)

(*) Notice: Subject to any disclaimer, the term of this patent is extended or adjusted under 35 U.S.C. 154(b) by 488 days.

(21) Appl. No.: 13/985,234

(22) PCT Filed: Feb. 14, 2012

(86) PCT No.: PCT/IL2012/000076
§ 371 (c)(1),
(2), (4) Date: Oct. 22, 2013

(87) PCT Pub. No.: WO2012/111002
PCT Pub. Date: Aug. 23, 2012

(65) Prior Publication Data
US 2014/0103714 A1 Apr. 17, 2014

Related U.S. Application Data

(60) Provisional application No. 61/442,502, filed on Feb. 14, 2011.

(51) Int. Cl.
H02J 1/00 (2006.01)
H02J 7/00 (2006.01)
H01M 2/10 (2006.01)

(52) U.S. Cl.
CPC ......... *H02J 7/0054* (2013.01); *H01M 2/1061* (2013.01); *H02J 1/00* (2013.01); *Y10T 307/344* (2015.04)

(58) Field of Classification Search
None
See application file for complete search history.

(56) References Cited

U.S. PATENT DOCUMENTS

| 5,786,106 | A | 7/1998 | Armani |
| 5,977,747 | A | 11/1999 | Huang |
| 6,458,783 | B1 | 10/2002 | Ding et al. |
| 6,528,969 | B2 * | 3/2003 | Tung ............... H02J 7/0063 320/103 |
| 6,636,751 | B1 | 10/2003 | McCartney |
| 6,709,784 | B2 * | 3/2004 | Resch ............... H01M 6/5033 320/103 |
| 7,489,105 | B2 | 2/2009 | Weinstein et al. |
| 7,612,997 | B1 | 11/2009 | Diebel |
| 7,628,275 | B2 | 12/2009 | Smith |
| 7,737,581 | B2 * | 6/2010 | Spurlin ............... A61M 5/1723 307/66 |

(Continued)

FOREIGN PATENT DOCUMENTS

WO 2012111002 8/2012

OTHER PUBLICATIONS

U.S. Appl. No. 61/442,502, filed Feb. 14, 2011.
(Continued)

*Primary Examiner* — Jared Fureman
*Assistant Examiner* — Aqeel H Bukhari
(74) *Attorney, Agent, or Firm* — Mark Nowotarski

(57) ABSTRACT

Apparatus is described, for use with a cellphone (10) that has a power supply, in which the apparatus includes energy-storage apparatus (20), including a housing (26), a battery (28) coupled to the housing, and a cellphone interface (30) coupled to the housing, configured to electrically couple the battery to the power supply of the cellphone and to carry current from the battery to the power supply. Other embodiments are also described.

5 Claims, 4 Drawing Sheets

(56) References Cited

U.S. PATENT DOCUMENTS

| | | | |
|---|---|---|---|
| 8,004,237 B2 | 8/2011 | Manor et al. | |
| 8,343,670 B2 | 1/2013 | Hoffman et al. | |
| 2003/0087676 A1* | 5/2003 | Lloyd | H04B 1/3883 455/569.1 |
| 2004/0053696 A1 | 3/2004 | Kim et al. | |
| 2007/0210749 A1* | 9/2007 | Hsieh | H02J 7/0054 320/114 |
| 2007/0241721 A1 | 10/2007 | Weinstein et al. | |
| 2008/0123287 A1 | 5/2008 | Rossell | |
| 2008/0148995 A1* | 6/2008 | Lawlor | C09D 17/00 106/499 |
| 2009/0137223 A1 | 9/2009 | Kroll | |
| 2010/0124040 A1 | 5/2010 | Diebel | |
| 2012/0088558 A1* | 4/2012 | Song | H04M 1/18 455/575.1 |

OTHER PUBLICATIONS

International Search Report for PCT/IL2012/000076 with Written Opinion, dated Jun. 8, 2012.
Kim, "Miccus Charge Block for iPod/iPhone Review", The Gadget Site Reviews, Apr. 19, 2010 [retrieved on May 23, 2012].
Miccus Charge Block Mini Portable Battery Charger for iPhones/iPods, Amazon.com, Feb. 7, 2010 [retrieved on May 24, 2012].
Hoter-Ishay, Market research portion of Igloo Presentation, Igloo Design Strategy, Aug. 2010.
Chargeall Touch of Modern, Phone Suit, Nov. 27, 2013 (downloaded from www.touchofmodern.com-sales-chargeall).
Luxa2, Touch of Modern, Nov. 27, 2013 (downloaded from www.touchofmodern.com-sales-luxa2).
PhoneSuit—Touch of Modern, Nov. 27, 2013 (downloaded from www.touchofmodern.com-sales-phonesuit--2).
Murphy, Mobile Devices Provide Power for Smartphones and Tablets, New York Times, Jan. 9, 2013.
Varta Consumer Batteries—Emergency 30-Pin Powerpack (www.en.varta-consumer.com), Dec. 2013.
Kommunikation, Letzte Reserve dated Oct. 1, 2013 (with English Translation).
Cell phone charger 1 (Librus.co.il), printed Dec. 2, 2013 (English Translation by Google translate).
Cell phone charger 2 (Librus.co.il), printed Dec. 2, 2013 (English Translation by Google translate).
Feb. 13, 2017 createpros.net Emergency one-time mobile charger disposable power bank.
Feb. 13, 2017 powrtabs (powrtabs.com).
Feb. 13, 2017 AOREAL Aireline supported one time use disposable powerbank (amazon.com).
Feb. 14, 2017 Smartbuy one time use disposable power bank (amazon.com).
Chargeall Touch of Modern, sent by client on Nov. 27 2013, (downloaded from: www.touchofmodern.com-sales-chargeall).
Luxa2—Touch of Modern, sent by client on Nov. 27 2013 (downloaded from: www.touchofmodern.com-sales-luxa2).
PhoneSuit—Touch of Modern, sent by client on Nov. 27 2013 (downloaded from: www.touchofmodern.com-sales-phonesuit--2).
Cellet portable emergency mobile charger (amazon.com—May 2011).
Murphy, Mobile Devices Provide Power for Smartphones and Tablets, NYTimes Jan. 2013.
Varta Consumer Batteries—Emergency 30-Pin Powerpack (www.en.varta-consumer.com, Dec. 2013.
Varta offers a couple of mobile energy suppliers a German article together with its English Translation (dated Oct. 2013).
Cell phone charger 1, a Hebrew Internet page including an English Translation (by Google translate) (Librus.co.il)—printed Dec. 2, 2013.
Cell phone charger 2, a Hebrew Internet page including an English Translation (by Google translate) (Librus.co.il)—printed Dec. 2, 2013.
Wikipedia "USB", version as of Feb. 12, 2011.
ML, Secondary Battery, Lithium Manganese Dioxide Rechareable Battery, Catalog as of Feb. 2013.
en.wikipedia.org, Lithium-ion battery, https://en.wikipedia.org/wiki/Lithium-ion_battery, last viewed Feb. 26, 2018.
en.wikipedia.org, Nickel-cadmium battery, https://en.wikipedia.org/wiki/Nickel%E2%80%93cadmium_battery, last viewed Feb. 26, 2018.
en.wikipedia.org, Nickel-metal hydride battery, https://en.wikipedia.org/wiki/Nickel%E2%80%93metal_hydride_battery, last viewed Feb. 26, 2018.
en.wikipedia.org, Rechareable alkaline battery, https://en.wikipedia.org/wiki/Rechargeable_alkaline_battery, last viewed Feb. 26, 2018.
Panasonic Automotive & Industrial Systems Europe GmbH 2015, Rechargeable Batteries: Nickel Cadmium, https://na.industrial.panasonic.com/products/batteries/rechargeable-batteries/nickel-cadmium, last viewed Feb. 26, 2018.
en.wikipedia.org, Zinc-air batery, https://en.wikipedia.org/wiki/Zinc%E2%80%93air_battery, last viewed Aug. 2, 2018.

* cited by examiner

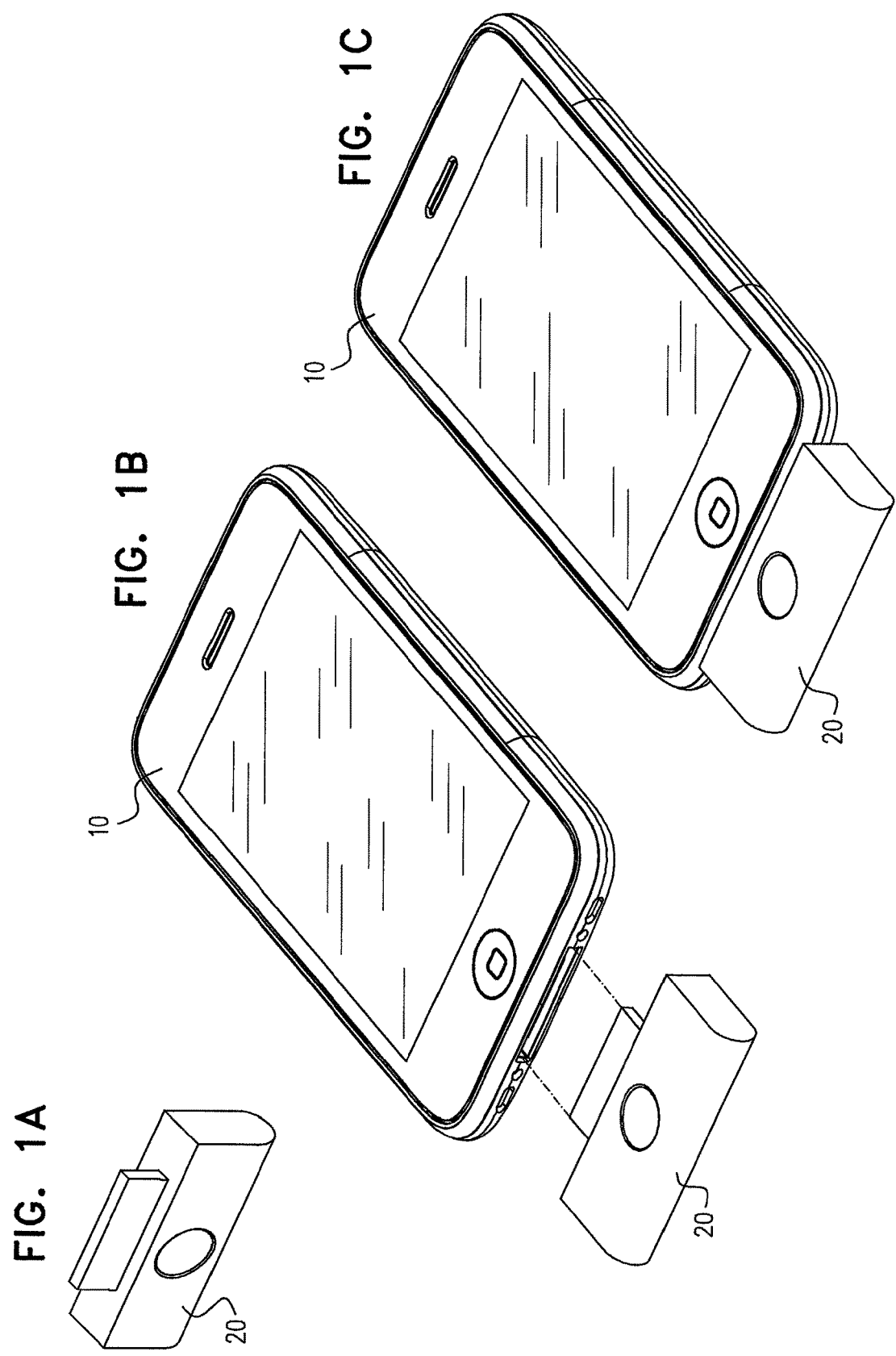

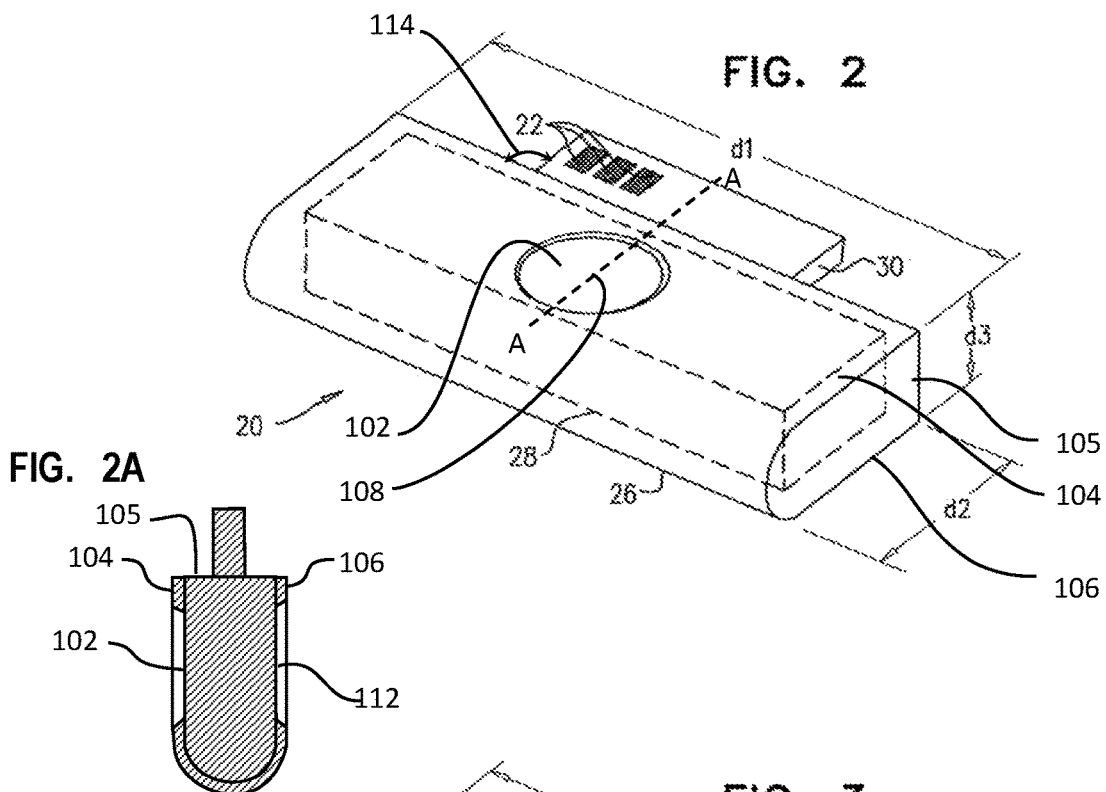
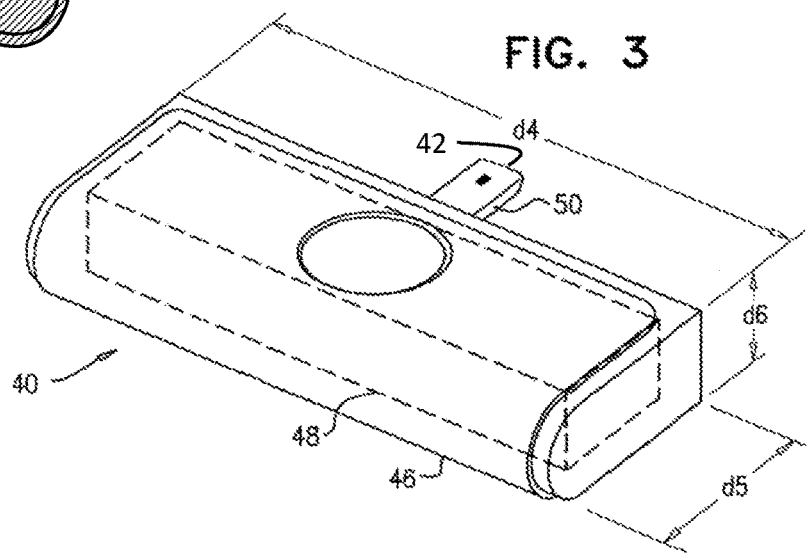

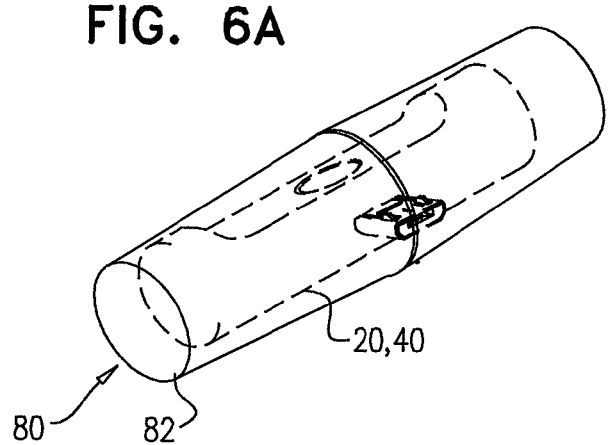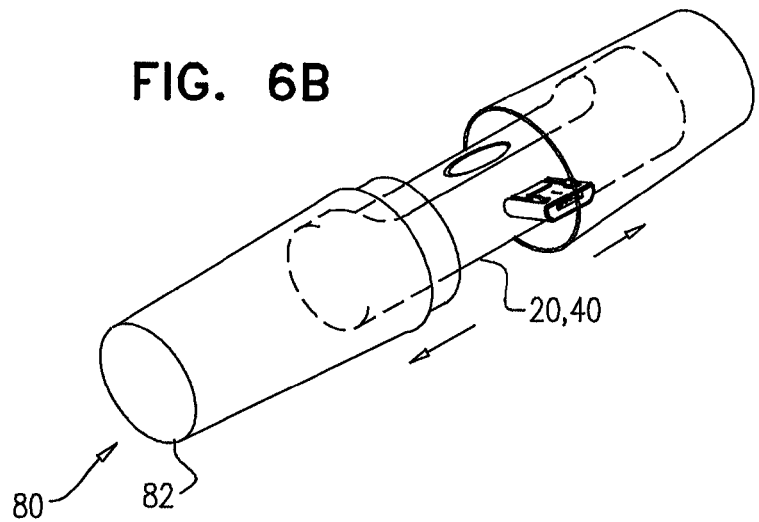

RESCUE BATTERY

CROSS REFERENCE TO RELATED APPLICATIONS

This is a National Stage of International Application No. PCT/IL2012/000076, filed Feb. 14, 2012, claiming priority from U.S. Patent Provisional Application No. 61/442,502, filed Feb. 14, 2011, the contents of all of which are incorporated herein by reference in their entirety.

FIELD OF THE APPLICATION

The present application relates generally to personal electronic devices, and specifically to methods and apparatus for providing backup power for a personal electronic device.

BACKGROUND OF THE APPLICATION

It is common today for people to carry electronic devices, such as cellphones, wherever they go. These cellphones often facilitate not only phone calls, but also internet use, e-mailing, data storage and retrieval, and the range of functions that in the past were reserved for larger computers. The batteries which power these devices frequently do not have the ability to supply enough energy until the next time that it is convenient to charge the batteries. As a result, there are times when a user must limit her use of the device in order to conserve battery power, and, more seriously, there are times when the user is unable to use the device whatsoever, because the batteries have died.

SUMMARY OF APPLICATIONS

In accordance with some applications of the present invention, energy-storage apparatus is provided for use with a cellphone that has a power supply. The apparatus comprises a housing and a battery coupled to the housing. A cellphone interface is coupled to the housing, and electrically couples the battery to the power supply of the cellphone. The cellphone interface carries current from the battery to the power supply of the cellphone. Typically, the apparatus is configured to provide a single backup supply, for use if the power source of the cellphone (i.e., the battery of the cellphone) has been allowed to become nearly of completely depleted.

For some applications, the battery of the apparatus and/or a packaging of the apparatus discourages a user from using (and thereby draining the power from) the apparatus for generally trivial and/or routine events, and/or encourages the user to retain the apparatus in a ready-to-use state for generally more important and/or emergency events.

There is therefore provided, in accordance with an application of the present invention, apparatus for use with a cellphone that has a power supply, the apparatus including energy-storage apparatus, including:

a housing;

a battery, coupled to the housing; and a cellphone interface coupled to the housing, configured to be inserted into an opening of the cellphone, to electrically couple the battery to the power supply of the cellphone, and to carry current from the battery to the power supply.

In an application, the battery includes a primary battery.

In an application, the battery includes a reserve battery.

In an application, the battery is not rechargeable.

In an application, the apparatus further includes a sealed packaging in which the energy-storage apparatus is disposed.

In an application, the packaging is configured to be generally not resealable following opening of the packaging.

In an application, the packaging includes a metal foil.

In an application, the packaging is generally impermeable to air.

In an application, the battery includes a reserve battery.

In an application, the packaging is configured to isolate a part of the reserve battery until the packaging is opened.

In an application, the packaging is configured to facilitate the activation of the reserve battery by the packaging being opened.

In an application, the packaging is generally impermeable to water.

In an application, the cellphone interface includes a plurality of exposed pins.

In an application, the cellphone interface is configured to rigidly couple the housing to the cellphone.

In an application, the battery has a shelf-life of greater than 1 year.

In an application, the apparatus is configured to encourage a user to retain the apparatus for a generally important or emergency event.

In an application, the apparatus includes labeling that encourages the user to retain the apparatus for the generally important or emergency event.

In an application, a total volume of the energy-storage apparatus is between 3 and 15 ml.

In an application, the total volume of the energy-storage apparatus is between 4.5 and 11 ml.

In an application, a longest dimension of the housing is between 20 and 70 mm, a height of the housing is between 10 and 40 mm, and a depth of the housing is between 5 and 30 mm.

In an application, the longest dimension of the housing is between 30 and 50 mm, the height of the housing is between 20 and 30 mm, and the depth of the housing is between 10 and 20 mm.

The present invention will be more fully understood from the following detailed description of embodiments thereof, taken together with the drawings, in which:

BRIEF DESCRIPTION OF THE DRAWINGS

FIGS. 1A-C are schematic illustrations of energy-storage apparatus, for use with a cellphone, in accordance with some applications of the present invention;

FIG. 2 is a schematic illustration of the energy-storage apparatus, in accordance with some applications of the present invention;

FIG. 2A is a cross section of the energy-storage apparatus of FIG. 2 taken through section A-A.

FIG. 3 is a schematic illustration of the energy-storage apparatus, in accordance with some applications of the present invention;

FIGS. 6A-B are schematic illustrations of a kit, comprising energy-storage apparatus in a packaging, in accordance with some applications of the invention.

DETAILED DESCRIPTION OF THE APPLICATIONS

Figure 4A:
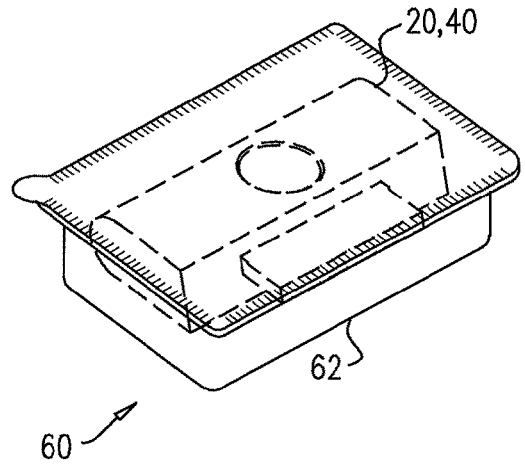
FIGS. 4A-B are schematic illustrations of a kit, comprising energy-storage apparatus in a packaging, in accordance with some applications of the invention.

Reference is made to FIGS. 1A-C, which are schematic illustrations, of energy-storage apparatus 20, for use with a cellphone 10, in accordance with some applications of the invention. FIG. 1A shows apparatus 20 alone, FIG. 1B shows apparatus 20 aligned for coupling to cellphone 10, and FIG. 1C shows apparatus 20 coupled to cellphone 10. Cellphone 10 typically comprises a commercially-available cellphone. Apparatus 20 provides power to the native power source of the cellphone, in order to charge the native power source of the cellphone and/or to allow use of the cellphone based on the power provided by apparatus 20.

Typically, apparatus 20 easily slots and/or clicks into place in cellphone 10, without an intervening cable. Typically, therefore, the coupling of apparatus 20 to cellphone 10 is generally rigid, and does not interfere with use of the cellphone by a user. FIG. 1 shows cellphone 10 comprising an iPhone™ (Apple), purely as an example. The scope of the present invention includes embodiments of the energy-storage apparatus for use with other cellphones, mutatis mutandis (e.g., as described hereinbelow).

Reference is made to FIG. 2, which is a schematic illustration of energy-storage apparatus 20, in accordance with an application of the present invention. Apparatus 20 comprises a housing 26 and a battery 28, which is typically disposed within the housing. The housing may comprise a front surface 104, back surface 106, and top surface 105. Apparatus 20 further comprises a cellphone interface 30, which protrudes from housing 26. The cellphone interface protrudes at a right angle 114 from said top surface 105. The cellphone interface is centered about a midpoint 108 of a length d1 of the housing. Interface 30 is configured (e.g., shaped) to interface with the charging and/or data port of cellphone 10. Interface 30 typically comprises one or more electrical conductors, such as pins 22, which are typically disposed on the surface of the interface. For example, interface 30 may comprise two or three pins 22. Pins 22 convey current from battery 28 to the power supply of the cellphone, via the normal charging mechanism (e.g., one or more charging electrodes) of the cellphone. A dimple 102 is provided in the front surface of the housing. The dimple is round and centered about the midpoint 108 of the length of the housing.

FIG. 2A is a cross section of the apparatus 20. A back dimple 112 is shown in the back surface 106. The back dimple and front dimple are opposite of each other.

FIG. 2 Shows interface 30 configured to interface with the charging and/or data port of an iPhone™ (Apple).

Typically, pins 22 do not provide paths for the flow of such types of data as internet data, e-mails, text files and photos. Instead, the pins are typically only used for providing power to the cellphone, using whatever protocols are normally invoked for the particular cellphone being powered by apparatus 20. However, some applications of the present invention may include the provision of such data flow in and out of the apparatus 20. For example, for some applications of the invention, apparatus 20 comprises a second interface (not shown). The second interface and interface 30 facilitate the flow of data between cellphone 10 and an external device, through apparatus 20. For some such applications, the second interface is identical to the port of the cellphone to which interface 30 couples, thereby facilitating the use of external devices that would otherwise by coupled directly to the port of the cellphone (e.g., devices that may already be owned by the user) to instead be coupled to the cellphone via the second interface.

Typically, apparatus 20 is quite small, e.g., having a total volume that is greater than 1 ml and/or less than 80 ml (for example, the volume may be 3-15 ml, or 4.5-11 ml). Typically, housing 28 has (1) a longest dimension (e.g., a length) d1 of between 20 and 70 mm, e.g., between 30 and 60 mm, (2) a height d2 of between 10 and 40 mm, e.g., between 20 and 30 mm, and (3) a depth d3 of between 5 and 30 mm, e.g., between 10 and 20 mm. Nevertheless, the scope of the present invention includes the energy-storage apparatus having other dimensions.

Reference is made to FIG. 3, which is a schematic illustration of energy-storage apparatus 40, embodied as energy-storage apparatus 40, in accordance with an application of the present invention. Apparatus 40 comprises a housing 46 and a battery 48, which is typically disposed within the housing. Apparatus 40 further comprises a cellphone interface 50, which protrudes from housing 46. Interface 50 is configured (e.g., shaped) to interface with the charging and/or data port of cellphone 10. Interface 50 typically comprises one or more electrical conductors, such as pins 42, which are typically disposed on the surface of the interface. For example, interface 50 may comprise two or three pins 42. Pins 42 convey current from battery 48 to the power supply of the cellphone, via the normal charging mechanism (e.g., a charging socket) of the cellphone. Typically, apparatus 40 and the components thereof, are analogous to apparatus 20 and the components thereof, described hereinabove.

FIG. 3 shows interface 50 comprising a Micro-USB plug, configured to interface with a Micro-USB receptacle. Micro-USB is a common interface for many cellphones, and is and/or is becoming, an industry standard in parts of the world (e.g., the European Union).

Typically, pins 42 do not provide paths for the flow of such types of data as internet data, e-mails, text files and photos. Instead, the pins are typically only used for providing power to the cellphone, using whatever protocols are normally invoked for the particular cellphone being powered by apparatus 40. However, some applications of the present invention may include the provision of such data flow in and out of apparatus 40. For example, for some applications of the invention, apparatus 40 comprises a second interface (not shown). The second interface and interface 50 facilitate the flow of data between cellphone 10 and an external device, through apparatus 40. For some such applications, the second interface comprises a counterpart to interface 50, e.g., whereas interface 50 is typically male (i.e., a Micro-USB plug), the second interface is the female counterpart (i.e., a Micro-USB receptacle), thereby facilitating the use of external devices that are compatible with cellphone 10, and that may already be owned by the user.

Typically, apparatus 40 is quite small, e.g., having a total volume that is greater than 1 ml and/or less than 80 ml (for example, the volume may be 3-15 ml, or 4.5-11 ml). Typically, housing 28 has (1) a longest dimension (e.g., a length) d1 of between 20 and 70 mm, e.g., between 30 and 60 mm, (2) a height d2 of between 10 and 40 mm, e.g., between 20 and 30 mm, and/or (3) a depth d3 of between 5 and 30 mm, e.g., between 10 and 20 mm. Nevertheless, the scope of the present invention includes the energy-storage apparatus having other dimensions.

Reference is again made to FIGS. 1-3. The battery (e.g., battery 28 and/or 48) is typically (but not necessarily) non-rechargeable (i.e., the battery is a primary battery), and stores enough energy to power a cellphone for a suitable amount of time for standard consumer use, e.g., ranging from 30 minutes of phone calls to providing a full recharge of the power supply of the cellphone. For some applications, the battery provides power for less than 30 minutes of phone calls.

Typically, the battery has a shelf-life of (i.e., is configured to store charge for) a duration that is greater than a year. For some applications, the battery is configured to be disposable in a generally environmentally friendly manner. For example, the battery may comprise little or no mercury or cadmium.

For some applications, the battery comprises a reserve battery, i.e., a battery in which a part of the battery is isolated until the battery is required. It is hypothesized that the use of a reserve battery increases the shelf-life of the apparatus.

Figure 4B:
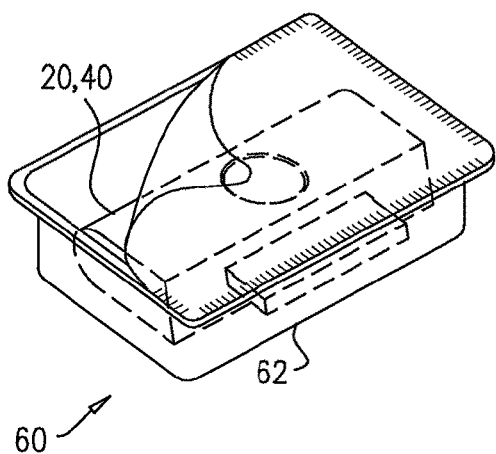

Reference is made to FIGS. 4A-B, which are schematic illustrations of a kit 60, comprising the energy-storage apparatus (e.g., energy-storage apparatus 20 and/or energy-storage apparatus 40), in a packaging 62. For some applications, packaging 62 is flexible. For some applications, packaging 62 comprises a metal (e.g., aluminum) foil and/or a plastic. For some applications, packaging 62 resembles a blister pack that is known in the art of pharmaceutical tablets. Packaging 62 typically comprises labeling (not shown) that discourages a user from using (and thereby draining the power from) the apparatus for generally trivial and/or routine events, and/or encourages the user to retain the apparatus in a ready-to-use state for generally more important and/or emergency events.

Typically, packaging 62 is configured to generally match the shape and/or size of the energy-storage apparatus, such that kit 60 is generally not significantly larger or bulkier than the energy-storage apparatus. For example, kit 60 may have a total volume that is typically less than 30% greater (e.g., less than 20% greater, such as less than 10% greater) than the volume of the energy-storage apparatus.

Packaging 62 is typically generally impermeable to air and water (e.g., hermetically sealed). For some of the applications in which the battery (e.g., battery 28 and/or 48) comprises a reserve battery, packaging 62 facilitates the isolation of the part of the reserve battery that is isolated until the battery is required. For example, for applications in which air is isolated from the battery until the battery is required (e.g., when the battery comprises a zinc-air battery), packaging 62 may isolate the battery from air until the energy-storage apparatus is required, and the packaging is opened. Thereby, for some such applications, packaging 62 (and/or the removal thereof) facilitates the activation of the reserve battery.

For some applications, and as shown in FIGS. 4A-B, packaging 62 is openable by peeling back a part of the packaging. For some applications, packaging 62 is openable by piercing a part of the packaging, e.g., a lidding, as is known in the art. Once packaging 62 has been opened, the packaging is typically not reclosable (e.g., resealable).

Figure 5A:
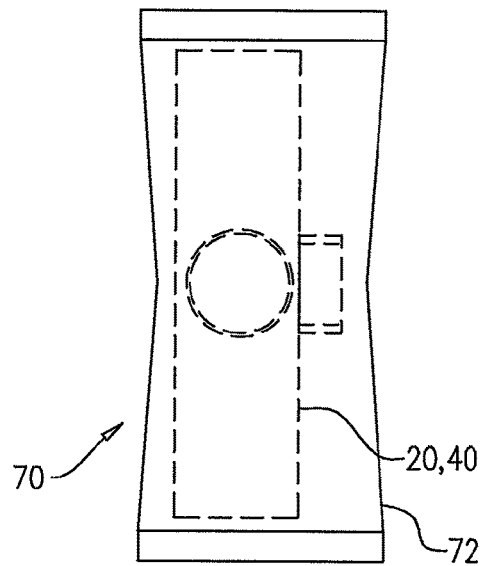
FIGS. 5A-B are schematic illustrations of a kit, comprising energy-storage apparatus in a packaging, in accordance with some applications of the invention.
Figure 5B:
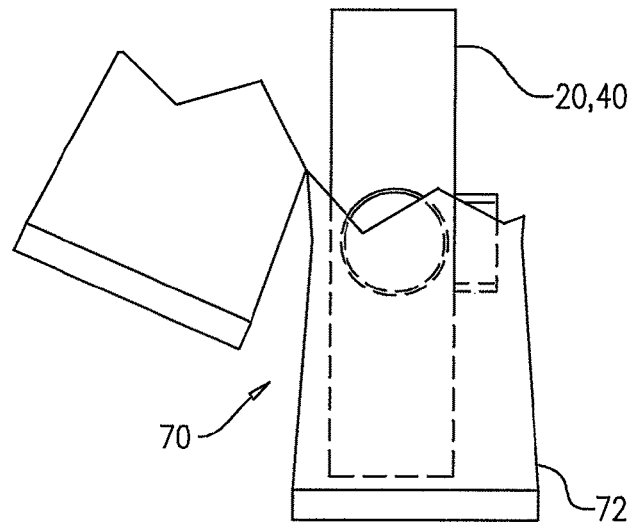

Reference is made to FIGS. 5A-B, which are schematic illustrations of a kit 70, comprising the energy-storage apparatus (e.g., energy-storage apparatus 20 and/or energy-storage apparatus 40), in a packaging 72. For some applications, packaging 72 is flexible. For some applications, packaging 72 comprises a metal (e.g., aluminum) foil pack and/or pouch. Packaging 72 typically comprises labeling (not shown) that discourages a user from using (and thereby draining the power from) the apparatus for generally trivial and/or routine events, and/or encourages the user to retain the apparatus in a ready-to-use state for generally more important and/or emergency events.

Typically, packaging 72 is configured to generally match the shape and/or size of the energy-storage apparatus, such that kit 70 is generally not significantly larger or bulkier than the energy-storage apparatus. For example, kit 70 may have a total volume that is typically less than 30% greater (e.g., less than 20% greater, such as less than 10% greater) than the volume of the energy-storage apparatus.

Packaging 72 is typically generally impermeable to air and water. For some of the applications in which the battery (e.g., battery 28 and/or 48) comprises a reserve battery, packaging 72 facilitates the isolation of the part of the battery that is isolated until the battery is required. For example, for applications in which air is isolated from the battery until the battery is required (e.g., when the battery comprises a zinc-air battery), packaging 72 may isolate the battery from air until the energy-storage apparatus is required, and the packaging is opened. Packaging 62 is typically generally impermeable to air and water (e.g., hermetically sealed). For some of the applications in which the battery (e.g., battery 28 and/or 48) comprises a reserve battery, packaging 62 facilitates the isolation of the part of the reserve battery that is isolated until the battery is required. For example, for applications in which air is isolated from the battery until the battery is required (e.g., when the battery comprises a zinc-air battery), packaging 62 may isolate the battery from air until the energy-storage apparatus is required, and the packaging is opened. Thereby, for some such applications, packaging 72 (and/or the removal thereof) facilitates the activation of the reserve battery.

Typically, and as shown in FIGS. 5A-B, packaging 72 is openable by tearing the packaging. Once packaging 72 has been opened, the packaging is typically not reclosable (e.g., resealable).

Reference is made to FIGS. 6A-C, which are schematic illustrations of a kit 80, comprising the energy-storage apparatus (e.g., energy-storage apparatus 20 and/or energy-storage apparatus 40), in a packaging 82. Typically, packaging 82 is rigid and comprises two sides. For some applications, packaging 82 resembles the casing of a lipstick or a mascara. It is hypothesized that this resemblance encourages a user to retain the apparatus in a handbag or similar article, such that it is available when needed. Packaging 82 typically comprises labeling (not shown) that discourages a user from using (and thereby draining the power from) the apparatus for generally trivial and/or routine events, and/or encourages the user to retain the apparatus in a ready-to-use state for generally more important and/or emergency events.

Typically, packaging 82 is configured to generally match the shape and/or size of the energy-storage apparatus, such that kit 80 is generally not significantly larger or bulkier than the energy-storage apparatus. For example, kit 80 may have a total volume that is typically less than 30% greater (e.g., less than 20% greater, such as less than 10% greater) than the volume of the energy-storage apparatus. Typically, and as shown in FIGS. 6A-B, packaging 82 is openable by separating the two parts of the packaging.

Reference is again made to FIGS. 1A-6B. As described hereinabove, the battery of the apparatus typically comprises a non-rechargeable battery, and/or the packaging is typically not resealable. Thereby, the energy-storage apparatus described hereinabove is typically configured to be used once only. It is hypothesized that the apparatus being configured to be used once only, discourages a user from using (and thereby draining the power from) the apparatus for generally trivial and/or routine events, and/or encourages the user to retain the apparatus in a ready-to-use state for generally more important and/or emergency events.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

I claim:

1. An apparatus for providing emergency backup power to a cellphone that has a power supply, the apparatus comprising:
 a housing;
 a non-rechargeable battery with at least a one-year shelf life, integrated within the housing; and
 a cellphone interface coupled to the housing, configured to be inserted into a data port of the cellphone, to electrically couple the battery to the power supply of the cellphone, to carry current from the battery to the power supply, and to provide the sole means of attachment of said apparatus to said cell phone such that said apparatus will remain attached to said cell phone under its own weight when said cell phone is in use
wherein:
 the energy-storage apparatus is in a ready-to-use state;
 a length of the housing is between 20 and 70 mm;
 a height of the housing is between 10 and 40 mm;
 a depth of the housing is between 5 and 30 mm;
 said length is longer than said height;
 said length is longer than said depth;
 said cellphone interface is rigidly coupled to a top surface of said housing and is centered at about a midpoint of said length;
 said cellphone interface proceeds at right angles from said housing;
 said housing comprises a front surface; and
 said front surface comprises a front open dimple centered at about said midpoint of said length.

2. The apparatus according to claim 1 wherein the cellphone interface is a Micro-USB plug.

3. The apparatus according to claim 1 wherein said apparatus is adapted to fit within a package with the shape and size of a lipstick case or a mascara case.

4. The apparatus according to claim 1, wherein said cellphone interface comprises at least three pins on a flat surface.

5. The apparatus according to claim 1 wherein said housing further comprises a back surface and wherein said back surface comprises a back dimple opposite of said front dimple.

* * * * *